United States Patent
Yamaguchi et al.

(10) Patent No.: US 12,240,301 B2
(45) Date of Patent: Mar. 4, 2025

(54) SERVICE HOLE COVER AND DOOR WIRING MODULE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Koji Yamaguchi, Osaka (JP); Housei Mizuno, Osaka (JP); Megumi Ishida, Osaka (JP)

(73) Assignees: AUTONETWORKKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 41 days.

(21) Appl. No.: 18/031,531

(22) PCT Filed: Oct. 5, 2021

(86) PCT No.: PCT/JP2021/036813
§ 371 (c)(1),
(2) Date: Apr. 12, 2023

(87) PCT Pub. No.: WO2022/085436
PCT Pub. Date: Apr. 28, 2022

(65) Prior Publication Data
US 2023/0382201 A1    Nov. 30, 2023

(30) Foreign Application Priority Data

Oct. 19, 2020    (JP) .................................. 2020-175114

(51) Int. Cl.
| | | |
|---|---|---|
| *B60J 5/04* | (2006.01) |
| *B60R 16/02* | (2006.01) |
| *H02G 3/02* | (2006.01) |

(52) U.S. Cl.
CPC .......... *B60J 5/0413* (2013.01); *B60R 16/0215* (2013.01); *H02G 3/02* (2013.01)

(58) Field of Classification Search
CPC ....... B60J 5/0413; B60R 16/0215; H02G 3/02
See application file for complete search history.

(56) References Cited

U.S. PATENT DOCUMENTS 5,884,434 A * 3/1999 Dedrich .................. E05B 85/12
                                                  296/146.7
6,035,601 A    3/2000 Yamaguchi et al.
(Continued)

FOREIGN PATENT DOCUMENTS

DE    202006011032 U1 †  1/2008
JP         9-147629          6/1997
(Continued)

OTHER PUBLICATIONS

Japan Official Action received in JP Application No. 2020-175114, dated Jul. 11, 2023.
(Continued)

*Primary Examiner* — Carlos Amaya
(74) *Attorney, Agent, or Firm* — GREENBLUM & BERNSTEIN, P.L.C.

(57) ABSTRACT

Provided is a service hole cover covering a service hole formed in an inner panel in a vehicle door panel, the service hole cover including: a cover body part covering the service hole; and at least one catching part provided to protrude from the cover body part to a side of the inner panel, wherein the catching part is caught on the inner panel while at least a part of the service hole is opened.

12 Claims, 8 Drawing Sheets

(56) References Cited

U.S. PATENT DOCUMENTS

| | | | |
|---|---|---|---|
| 6,381,906 B1 * | 5/2002 | Pacella | B60J 5/0416 |
| | | | 296/146.7 |
| 8,020,921 B2 * | 9/2011 | Moberg | B60J 5/04 |
| | | | 296/146.7 |
| 2022/0017026 A1 | 1/2022 | Yamaguchi et al. | |

FOREIGN PATENT DOCUMENTS

| | | |
|---|---|---|
| JP | 9-169214 | 6/1997 |
| JP | 2020-83075 | 6/2020 |

OTHER PUBLICATIONS

International Search Report issued in International Patent Application No. PCT/JP2021/036813, dated Nov. 30, 2021, English translation.

International Preliminary Report on Patentability, issued in International Patent Application No. PCT/JP2021/036813, dated Apr. 13, 2023, with English translation.

\* cited by examiner
† cited by third party

SERVICE HOLE COVER AND DOOR WIRING MODULE

TECHNICAL FIELD

The present disclosure relates to a service hole cover and a door wiring module.

BACKGROUND ART

Patent Document 1 discloses a door wiring module including: a door functional planar member incorporated between a door panel and a design trim; a wiring member held by the door functional planar member; and an exterior member as a portion of the wiring member extending to an outer side from the door functional planar member in which a portion incorporated into a door is held. Patent Document 1 exemplifies a case where the door functional planar member is a component blocking an opening formed in an inner penal of a door panel.

PRIOR ART DOCUMENTS

Patent Document(s)

Patent Document 1: Japanese Patent Application Laid-Open No. 2020-083075.

SUMMARY

Problem to be Solved by the Invention

An opening formed in an inner panel is used as a service hole for performing an operation in a door panel in some cases. Assumed as the operation in the door panel are an operation of routing a wiring member in a door panel and an operation of connecting a connector on an end portion of a wiring member to a connector in a door panel, for example.

The wiring member is assembled to the door panel through the service hole in some cases. In this case, the wiring member is assumed to be held in the service hole cover covering the service hole or incorporated to pass through a through hole or a concave formed in the service hole cover.

In such a case, it is desired that the service hole cover can be temporarily held near the service hole while ensuring an operation region in the service hole to easily perform an operation of assembling the wiring member to the door panel.

Accordingly, an object of the present disclosure to provide a technique capable of temporarily holding a service hole cover near a service hole while ensuring an operation region in the service hole.

Means to Solve the Problem

A service hole cover according to the present disclosure is a service hole cover covering a service hole formed in an inner panel in a vehicle door panel, including: a cover body part covering the service hole; and at least one catching part provided to protrude from the cover body part to a side of the inner panel, wherein the catching part is caught on the inner panel while at least a part of the service hole is opened.

Effects of the Invention

According to the present disclosure, a service hole cover can be temporarily held near a service hole while ensuring an operation region in the service hole.

DESCRIPTION OF EMBODIMENT(S)

Description of Embodiment of Present Disclosure

Figure 1:
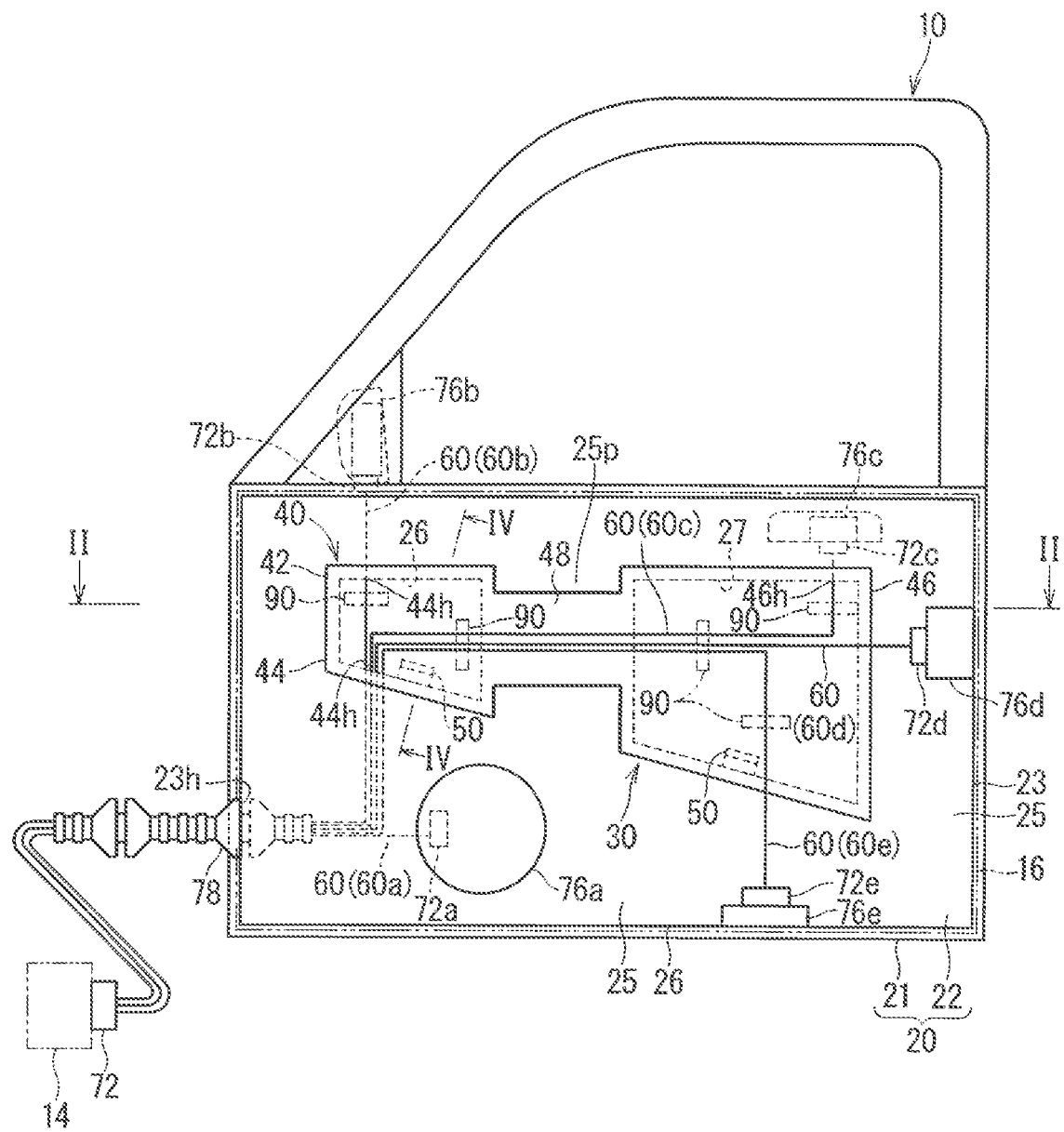
FIG. 1 is a schematic side view illustrating a door into which a service hole cover and a door wiring module according to an embodiment 1 are incorporated.

Embodiments of the present disclosure are listed and described firstly.

A service hole cover or a door wiring module according to the present disclosure is as follows.

(1) A service hole cover covering a service hole formed in an inner panel in a vehicle door panel includes: a cover body part covering the service hole; and at least one catching part provided to protrude from the cover body part to a side of the inner panel, wherein the catching part is caught on the inner panel while at least a part of the service hole is opened.

According to the service hole cover, the catching part is caught on the inner panel, thus the service hole cover is temporarily held near the service hole. At least a part of the service hole is opened while the catching part is caught on the inner panel, thus this opened area can be used as an operation region in the service hole. Thus, the service hole cover can be temporarily held near the service hole while ensuring the operation region in the service hole.

(2) In the service hole cover according to (1), a wiring passing part in which a wiring member passes through a portion between both surfaces of the cover body part is formed in the cover body part, and the wiring passing part is formed adjacent to the catching part. The portion of the cover body part provided with the catching part is held near the inner panel, and a portion of the cover body part away from the catching part gets away from the service hole, thus at least a part of the service hole is assumed to be opened. Thus, when the wiring passing part is provided adjacent to the catching part, a difference of a length of a route of the wiring member passing through the wiring passing part can be reduced between the temporal holding state of the service hole cover and an assembling state of the service hole cover assembled to the inner panel. Accordingly, an excessive length of the wiring member can be made to be as short as possible.

(3) In the service hole cover according to (1) or (2), it is also applicable that the catching part includes: a base part protruding from the cover body part toward an inner side of the vehicle door panel; and a tip catching part protruding to an outer periphery side of the cover body part from the base part in a position away from the cover body part, and the tip catching part is caught on the inner panel from an inner side of the vehicle door panel while the base part has contact with an edge of the service hole. In this case, the catching part is caught on the edge of the service hole, thus the service hole cover is temporarily held on the inner panel easily.

(4) In the service hole cover according to (3), the tip catching part may be provided in a position away form an inner surface of the inner panel while the service hole cover is attached to the inner panel. In this case, a gap can be provided between the inner panel and the service hole cover in accordance with a dimension from the tip catching part to the inner surface of the inner panel while the service hole cover is attached to the inner panel. At least a part of the service hole can be opened by this gap.

(5) In the service hole cover according to any one of (2) to (4), it is also applicable that the plurality of catching parts are provided, and at least a part of the service hole is opened while the plurality of catching parts are caught on the edge of the service hole. In this case, a temporal holding state of the service hole cover is stabilized.

(6) In the service hole cover according to (1) or (2), it is also applicable that the catching part includes an axis part protruding from the cover body part toward an inner side of the vehicle door panel and a retaining part protruding to an outer periphery side of the axis part in a position away from the cover body part, and the retaining part is caught on the inner panel from the inner side of the vehicle door panel while the axis part rotatably passes through a hole part formed in the inner panel. In this case, the catching part is inserted into the hole part of the inner panel and is caught thereon so as not to come out of the hole part, thus the service hole cover is temporarily held on the inner panel. In this case, the service hole cover is rotated around the axis part, thus at least a part of the service hole can be opened.

(7) In the service hole cover according to (6), the retaining part may be provided in a position away form an inner surface of the inner panel while the service hole cover is attached to the inner panel. In this case, a gap can be provided between the inner panel and the service hole cover in accordance with a dimension from the retaining part to the inner surface of the inner panel while the service hole cover is attached to the inner panel. The service hole cover can be easily rotated around the axis part by this gap, thus at least a part of the service hole can be opened.

(8) In the service hole cover according to (6) or (7), it is also applicable that the cover body part includes a first cover body part covering a first service hole, a second cover body part covering a second service hole, and a connection part connecting the first cover body part and the second cover body part, and the axis part is provided to the connection part to be rotatably inserted into the hole part formed between the first service hole and the second service hole in the inner panel. In this case, the cover body part can be rotated around the axis part between the first cover body part and the second cover body part. Thus, a portion of the first service hole away from the axis part and a portion of the second service hole away from the axis part can be easily opened.

(9) In the service hole cover according to any one of (6) to (8), the cover body part may further include a rotation regulation protrusion part caught in the edge of the service hole while the cover body part is rotated around the axis part from an attachment posture in which the cover body part covers the service hole. Accordingly, a state where the cover body part is rotated from the attachment posture to open at least a part of the service hole is stably kept easily.

(10) Also applicable is a door wiring module including: the service hole cover according to any one of (1) to (9); and a wiring member held by the service hole cover. Accordingly, it is possible to easily perform an operation of attaching the wiring member held by the service hole cover to the vehicle door panel using the service hole while the service hole cover is temporarily held near the service hole.

Details of Embodiment of Present Disclosure

Specific examples of a service hole cover and a door wiring module of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
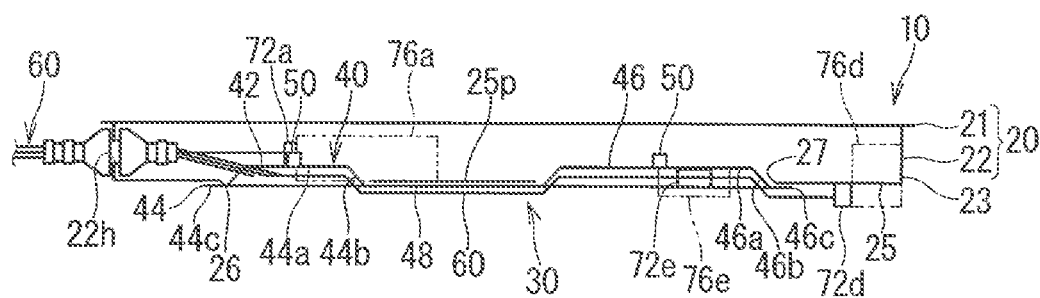
FIG. 2 is a schematic cross-sectional view along a II-II line in FIG. 1.
Figure 3:
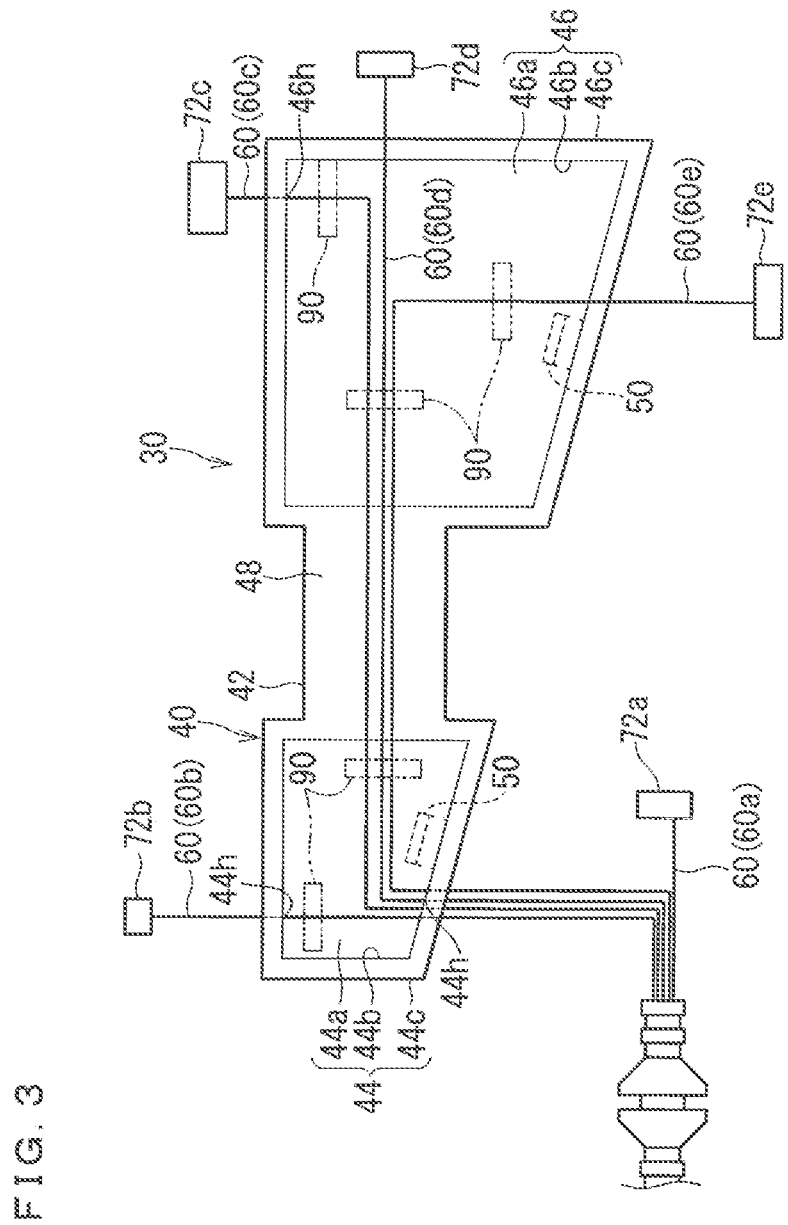
FIG. 3 is a schematic side view illustrating the door wiring module.
Figure 4:
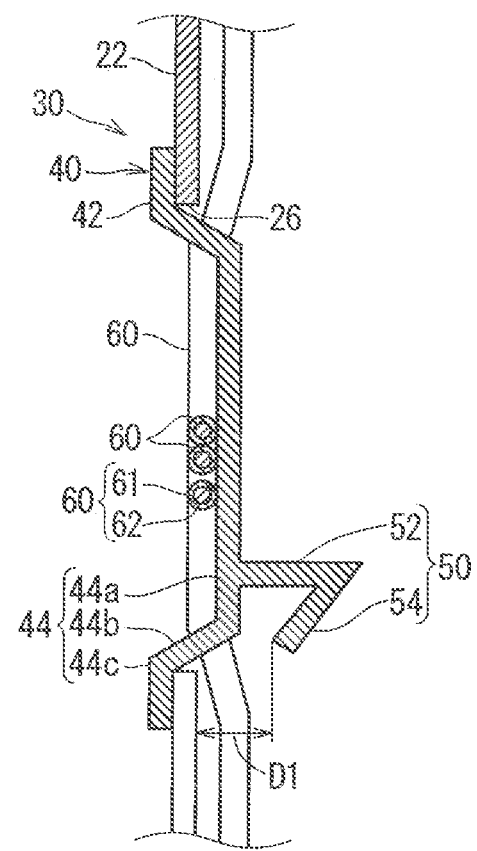
FIG. 4 is a schematic cross-sectional view along a IV-IV line in FIG. 1.

A service hole cover and a door wiring module according to an embodiment 1 are described hereinafter. FIG. 1 is a schematic side view illustrating a door 10 into which a service hole cover 40 and a door wiring module 30 according to the embodiment 1 are incorporated. FIG. 2 is a schematic cross-sectional view along a II-II line in FIG. 1. FIG. 3 is a schematic side view illustrating the door wiring module 30. FIG. 4 is a schematic cross-sectional view along a IV-IV line in FIG. 1. In FIG. 1 to FIG. 3, for example, the wiring member illustrated by one line may be one wiring member or a plurality of wiring members.

Firstly, an outline of a door 10 in a vehicle is described. The door 10 is formed into a flat shape as a whole, and is a part openable and closable to partition an inner side and outer side of a vehicle. The door 10 is assumed to be a driver side door, a passenger's side door, and a rear seat door, for example. The door 10 includes a vehicle door panel 20, a design trim 16, and a door wiring module 30.

The vehicle door panel 20 includes an outer panel 21 and an inner panel 22. The outer panel 21 is provided to a portion of the door 10 facing an outer side of the vehicle. The outer panel 21 is a part constituting an outer appearance of the vehicle together with a body of the vehicle. The inner panel 22 is provided on a vehicle interior side of the outer panel 21. The inner panel 22 includes a side plate part 23 and a main plate part 25. The side plate part 23 is a part protruding from the outer panel 21 to the inner side of the vehicle. The main plate part 25 is a part continuing into the side plate part 23, and extends along the outer panel 21 with a distance from the outer panel 21. A space is formed between the outer panel 21, the main plate part 25, and the side plate part 23. A door apparatus provided to the door 10 is disposed and a window is housed in the space. A first service hole 26 and a second service hole 27 are provided to the main plate part 25 of the inner panel 22. Each of the first service hole 26 and the second service hole 27 has an opening on both surface sides of the inner panel 22. Thus, an operator can have access to a space in the vehicle door panel 20 through the first service hole 26 or the second service hole 27. The operator can easily perform an operation in the space in the vehicle door panel 20 such as an operation of leading out the wiring member or an operation of connecting the wiring member to the door apparatus, for example, by using the first service hole 26 or the second service hole 27.

The first service hole 26 and the second service hole 27 are formed separately from each other. In the present embodiment, the first service hole 26 and the second service hole 27 are formed separately in a front-back direction of the vehicle.

More specifically, the first service hole 26 and the second service hole 27 are set to have a size to such an extent that the operator can pass his/her hand, that is, a minimum opening width of 10 cm or preferably 15 cm or more, for example. In the example illustrated in FIG. 1, the first service hole 26 and the second service hole 27 are formed into a rectangular shape. A size of the first service hole 26 in an up-down direction is smaller than that of the second service hole 27 in the up-down direction. A lower edge of each of the first service hole 26 and the second service hole 27 extends backward to be directed to a lower side. At least a part of the lower edge of the second service hole 27 is located on an extension of at least a part of the lower edge of the first service hole 26. The first service hole 26 and the second service hole 27 may have a circular shape or a polygonal shape such as a triangular shape. The opening of the first service hole 26 may be larger than that of the second service hole 27, or they may also have the same size.

The first service hole 26 is formed in a position in the inner panel 22 closer to a front side. The second service hole 27 is formed in a position in the inner panel 22 closer to a back side. The second service hole 27 is located on a back side of the vehicle in a front-back direction with a distance from the first service hole 26.

A portion of the inner panel 22 between the first service hole 26 and the second service hole 27 is formed to be an intervention portion 25p. The intervention portion 25p is a planar portion formed along the up-down direction. The intervention portion 25p may protrude to an outer side (vehicle interior side) of the inner panel 22. For example, the intervention portion 25p may be formed by being curved to be convex to a side opposite to the outer panel 21 by a press working, for example. In this case, when the intervention portion 25p is observed from an inner side of the vehicle door panel 20, a concave groove extending along the up-down direction is observed. A rail liftably supporting a runner for going up and down a window may be provided along this concave groove. The intervention portion 25p may be flatly formed, or may also be formed into a shape concaved when seen from the vehicle interior side.

The design trim 16 is a part provided to a portion of the door 10 facing the inner side of the vehicle to constitute the interior of the vehicle. An inner handle and an operation part of an in-vehicle apparatus, for example, are attached to the design trim 16.

The service hole cover 40 covers the service holes 26 and 27 formed in the inner panel 22 in the vehicle door panel 20 described above. The door wiring module 30 has a configuration that the service hole cover 40 and the wiring member 60 are integrally formed by holding the wiring member 60 by the service hole cover 40.

The service hole cover 40 includes a cover body part 42 and a catching part 50. The cover body part 42 is a part covering the service holes 26 and 27, and is formed into a shape extending on the inner panel 22 on a side opposite to the outer panel 21 (vehicle interior side). The catching part 50 is a part provided to protrude from the cover body part 42 on a side of the inner panel 22, more specifically, provided to protrude toward an inner portion of the vehicle door panel 20. Such a service hole cover 40 is a molded component made of resin such as polypropylene (PP), for example. The service hole cover 40 may be a component made up of melted resin injected in a mold and injection-molded or a compacted component made up of a non-woven cloth, for example, heated and compressed by a simple mold. The service hole cover 40 may be a component made up of a combination of the molded cover body part 42 and the catching part 50 formed separately from the cover body part 42. In this case, the catching part 50 may be fitted into and fixed to the cover body part 42. The cover body part 42 may be molded using the catching part 50 as an insert component. Then, the catching part 50 can be caught on the inner panel 22 in a state before the service hole cover 40 is attached to the inner panel 22. In this state, the service hole cover 40 is held near the service holes 26 and 27 while at least a part of the service hole 26 and/or the service hole 27 is opened.

The cover body part 42 is formed into a shape capable of covering the service holes 26 and 27 in accordance with the service holes 26 and 27 formed in the inner panel 22. In the present embodiment, the body part 42 includes a first cover body part 44, a second cover body part 46, and a connection part 48.

The first cover body part 44 is formed into a shape covering the first service hole 26 described above. More specifically, the first cover body part 44 is a flat resin part extending to be equal to or larger than the first service hole 26. The first cover body part 44 may extend to have a shape similar to that of the opening of the first service hole 26. The first cover body part 44 is attached to cover the first service hole 26. Accordingly, the service hole cover 40 can partition the inner side and outer side of the vehicle.

The second cover body part 46 is formed into a shape covering the second service hole 27. The second cover body part 46 is a flat resin component extending to be equal to or larger than the second service hole 27. The second cover body part 46 may extend to have a shape similar to that of the opening of the second service hole 27. A role and an attachment structure of the second cover body part 46 on the second service hole 27 are similar to those of the first cover body part 44 on the first service hole 26 described above.

The attachment state is held by screwing, a locking structure, or adhesion, for example, while the first cover body part 44 and the second cover body part 46 are attached to the service holes 26 and 27 of the inner panel 22. For example, when a peripheral edge portion of the first cover body part 44 overlapped with the inner panel 22 is bonded to the inner panel 22, a gap therebetween can be practicably covered. In the similar manner, when a peripheral edge portion of the second cover body part 46 overlapped with the inner panel 22 is bonded to the inner panel 22, a gap therebetween can be practicably covered.

The first cover body part 44 and the second cover body part 46 are attached to the service holes 26 and 27 as described above, thus the first cover body part 44 and the second cover body part 46 partition the inner side the vehicle of a space between the outer panel 21 and the inner panel 22. A window exposed to a rainwater environment is housed in the space, and a slit-like opening through which the window goes in and out is formed on an upper side of the space. Thus, the space is a space which water may enter. The space is a space which may be connected to an outer space, thus is also a space which a wind noise, for example, may enter from outside. Thus, it is sufficient that the first cover body part 44 and the second cover body part 46 are provided as members for completely partitioning a vehicle interior space and an outer space with the inner panel 22.

More specifically, the first cover body part 44 includes a main cover part 44a, a frame part 44b, and a flange part 44c.

The main cover part 44a is a part planarly extending to a range equal to or smaller (slightly smaller) than the first service hole 26. The frame part 44b is formed to protrude to a side of one main surface (inner side of the vehicle) of the main cover part 44a from an outer edge of the main cover part 44a. The flange part 44c is formed to protrude to an outer periphery side from an outer edge of the frame part 44b. The frame part 44b is formed to extend to an outer side of the main cover part 44a from the main cover part 44a toward the flange part 44c. The main cover part 44a is disposed on an inner side of the first service hole 26 (closer to a side of the outer panel 21 than the main plate part 25) while the first cover body part 44 is attached to a portion of the inner panel 22 where the first service hole 26 is formed, the flange part 44c is disposed on an outer side of the first service hole 26 (closer to the inner side of the vehicle than the main plate part 25), and the frame part 44b connects the main cover part 44a and the flange part 44c. Accordingly, the frame part 44b and the flange part 44c cover a portion between an edge portion of the main cover part 44a and an inner edge portion of the first service hole 26.

The second cover body part 46 includes a main cover part 46a, a frame part 46b, and a flange part 46c. The main cover part 46a, the frame part 46b, and the flange part 46c have a configuration similar to the main cover part 44a, the frame part 44b, and the flange part 44c described above except that they have a configuration matching the second service hole 27.

The connection part 48 is a part connecting the first cover body part 44 and the second cover body part 46. Herein, the connection part 48 connects a back edge portion (an edge on a side of the second cover body part 46) of the first cover body part 44 and a front edge portion (an edge on a side of the first cover body part 44) of the second cover body part 46. The connection part 48 may be a part extending to an outer side from the flange parts 44c and 46c described above. The connection part 48 is a part formed integrally with the first cover body part 44 and the second cover body part 46, for example. It is also applicable that the connection part 48 may be a part formed separately from the first cover body part 44 and the second cover body part, and bonded to the first cover body part 44 and the second cover body part 46 by an adhesive agent or welding, for example.

A dimension between front and back edges of the connection part 48 is set in accordance with an interval between the service holes 26 and 27. Thus, the first cover body part 44 and the second cover body part 46 held by the connection part 48 can be collectively disposed on both the service holes 26 and 27 easily. A vertical dimension of the connection part 48 is set to be smaller than that of the back edge portion of the first cover body part 44 and the front edge portion of the second cover body part 46. Accordingly, the first cover body part 44 and the second cover body part 46 are connected by a light and small amount of material.

The connection part 48 described above may be a part formed integrally with the first cover body part 44 and the second cover body part 46, for example. It is also applicable that the connection part 48 may be a part formed separately from the first cover body part 44 and the second cover body part, and bonded to the first cover body part 44 and the second cover body part 46 by an adhesive agent or welding, for example.

The first cover body part 44 and the second cover body part 46 need not necessarily be connected by the connection part 48 to be integrated with each other. It is also applicable that the connection part 48 is omitted, and the first cover body part 44 and the second cover body part 46 are made as separated parts. Both the first service hole 26 and the second service hole 27 need not necessarily be provided to the inner panel 22. The other service hole may be further provided to the inner panel 22. Only one service hole may be provided to the inner panel 22.

Wiring passing parts 44h and 46h through which the wiring member 60 passes between both surfaces of the cover body part 42 may be formed in the cover body part 42 described above. The wiring member 60 passes through the wiring passing parts 44h and 46h, thus the wiring member 60 can be disposed in both spaces partitioned by the inner panel 22 and the service hole cover 40. The wiring passing parts 44h and 46h may be holes passing through both surfaces of the first cover body part 44 or the second cover body part 46. The wiring passing parts 44h and 46h may be concave portions formed to be concaved to an inner side from the edge of the first cover body part 44 or the second cover body part 46. It is sufficient that the wiring passing parts 44h and 64h are formed in the main cover parts 44a and 46a or the frame parts 44b and 46b in the cover body parts 44 and 46. Herein, the wiring passing parts 44h and 46h are formed in the frame parts 44b and 46b.

Figure 5:
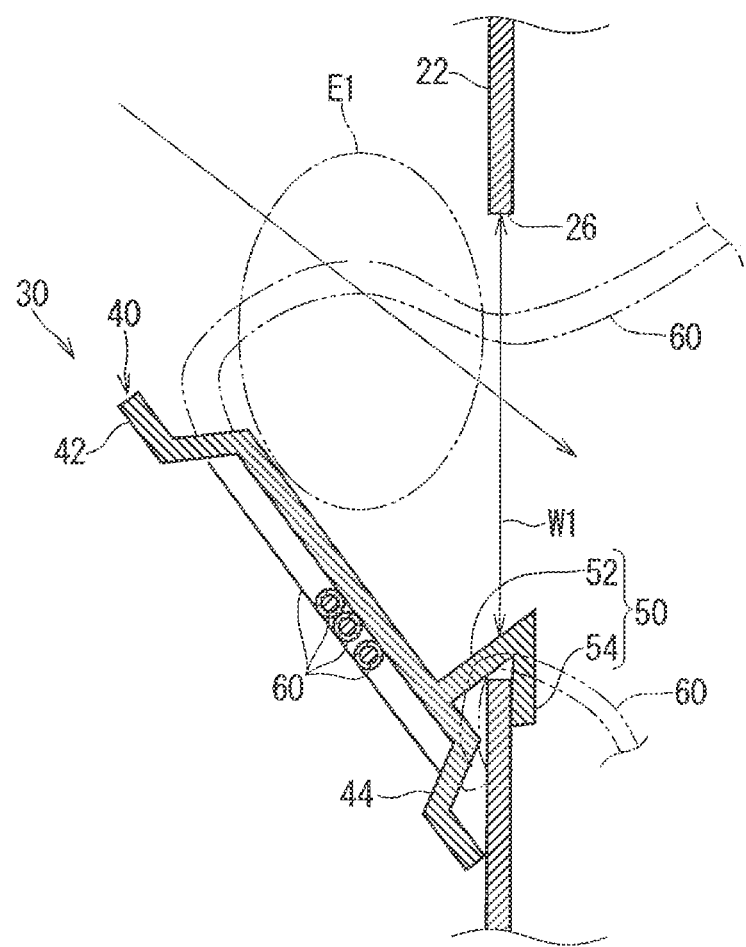
FIG. 5 is a schematic cross-sectional view illustrating a temporal holding state.

FIG. 5 illustrates a state where at least a part of the service hole 26 and/or the service hole 27 is opened while the catching part 50 is caught on the inner panel 22 in the schematic cross section corresponding to FIG. 4. As illustrated in FIG. 1 to FIG. 5, the catching part 50 is a part caught on the inner panel 22 while at least a part of the service hole 26 and/or the service hole 27 is opened. Herein, the state where at least a part of the service hole 26 and/or the service hole 27 is opened indicates a state where at least a part of the service hole 26 and/or the service hole 27 is opened so that a hand of an operator or a robot hand can enter the part from an outer side of the vehicle door panel 20. Accordingly, even when the service holes 26 and 27 are hidden by the service hole cover 40 when seen from the vehicle interior side, at least a part of the service hole 26 and/or the service hole 27 is opened when the service hole cover 40 is away from the service holes 26 and 27 and the hand of the operator can enter the service holes 26 and 27 through a gap between the inner panel 22 and the service hole cover 40, for example.

The plurality of catching parts 50 are provided in the present embodiment. More specifically, the catching part 50 is provided to each of the first cover body part 44 and the second cover body part 46. The catching part 50 may be formed on a lower side of the first cover body part 44 and the second cover body part 46 (closer to a center and a lower side in an up-down direction). Then, at least a part of the service hole 26 and/or the service hole 27 is opened while the plurality of catching parts 50 are caught on the edges of the service holes 26 and 27 (the lower edge herein). The number of the catching parts 50 may be one, or may also be three or more. The catching part 50 is inclined around a region where the catching part 50 is caught on the inner panel 22, thus the service hole cover 40 opens at least a part of the service hole 26 and/or the service hole 27. Thus, when three or more catching parts 50 are provided, it is preferable that the three or more catching parts 50 are provided in positions linearly arranged.

The catching part 50 includes a base part 52 and a tip catching part 54. The base part 52 protrudes from the cover body part 42 toward an inner side of the vehicle door panel 20. The base part 52 is provided to protrude in a position closer to the inner side in relation to an intermediate portion of the lower edge of the first cover body part 44 (or the second cover body part 46) in an extension direction thereof in a surface of the first cover body part 44 (or the second cover body part 46) facing the inner side of the vehicle door panel 20. The tip catching part 54 is formed into a shape protruding from the base part 52 to an outer periphery side (that is to say, a side of the flange parts 44c and 46c) of the cover body part 42 (the first cover body part 44 or the second cover body part 46) in a position away from the cover body part 42 (the first cover body part 44 or the second cover body part 46) by a distance D1.

The tip catching part 54 is caught on the inner panel 22 from the inner side of the vehicle door panel 20 while the base part 52 has contact with the edges of the service holes 26 and 27 (the lower side edges herein) by self-weight. More specifically, the service hole cover 40 is inclined around a region where the catching part 50 is caught on the inner panel 22 in the state where the catching part 50 is caught on the inner panel 22. Then, an upper portion of the service hole cover 40 gets away from the inner panel 22 until a lower portion of the service hole cover 40 lower than the catching part 50 (for example, the lower edge) comes in contact with the inner panel 22. Accordingly, at least a part of the service hole 26 and/or the service hole 27 (particularly, the upper portion) is opened to an outer side (the vehicle interior side), an operation region E1 for the operator to put his/her hand is formed in this portion, and substantially a whole region W1 of the service holes 26 and 27 is opened.

The catching part 50 described above is not caught on the inner panel 22 in a final assembling state where the service hole cover 40 is assembled to the inner panel 22 to cover the service holes 26 and 27. Thus, in the final assembling state, the tip catching part 54 described above is provided in a position away from the inner surface (a surface directed to the inner side of the vehicle door panel 20) of the inner panel 22 (refer to FIG. 4). Accordingly, the service hole cover 40 can be temporarily held in the position away from the inner panel 22 by the catching part 50 caught on the inner panel 22. Such a configuration is advantageous in opening the service holes 26 and 27 more greatly. In the final assembling state, the base part 52 may also be provided in a position away from the edges of the service holes 26 and 27.

The tip catching part 54 described above may be inclined with respect to the base part 52 to face a base end portion of the base part 52. That is to say, in the state where the catching part 50 is caught on the edges of the service holes 26 and 27 as described above, the base part 52 is directed obliquely downward toward an outer direction away from the edges of the service holes 26 and 27. When the tip catching part 54 described above is inclined to face the base end portion of the base part 52, the tip catching part 54 easily keep a parallel posture with respect to the inner surface of the inner panel 22 or a state where the tip end portion has contact with the inner surface of the inner panel 22 also in the posture described above, thus hardly slips on the inner panel 22 and comes out thereof.

At least one of the wiring passing part 44h and/or the wiring passing part 46h described above may be formed adjacent to the catching part 50. Preferably, at least one of the wiring passing part 44h and/or the wiring passing part 46h may be formed adjacent to the catching part 50 in a portion of any linear edge or arc-like edge around the service hole cover 40. At least one of the wiring passing part 44h and/or the wiring passing part 46h may be provided in a position with a distance of 20 cm or less, preferably a position with a distance of 10 cm or less, and more preferably a position with a distance of 5 cm or less from the catching part 50.

As described above, the service hole cover 40 is inclined around the region where the catching part 50 is caught on the inner panel 22, thereby opening at least a part of the service hole 26 and/or the service hole 27. Herein, when a difference of a wiring route of the wiring member 60 passing through the wiring passing parts 44h and 46h is small between the temporal holding state and the final assembling state described above, an excessive length in operation necessary for routing the wiring member 60 can be made to be as small as possible. At least one of the wiring passing part 44h and/or the wiring passing part 46h is formed adjacent to the catching part 50, the excessive length in operation necessary for the wiring member 60 can be made to be as small as possible.

The plurality of wiring members 60 connect a door apparatus and a vehicle body apparatus 14 provided to a vehicle body to supply electrical power to the door apparatus or transmit a signal between the door apparatus and the vehicle body apparatus 14. The wiring member 60 may be an electrical wire 60. A covering wire having a core wire 61 made up of a conductor with a covering layer 62 around the core wire 61 can be used as the electrical wire 60 (refer to FIG. 4). The core wire 61 may be a single core wire or a stranded wire. A type of the electrical wire 60 is not particularly limited, but can include a single wire or a composite wire. The single wire is an electrical wire having one conductive route. The composite wire is an electrical wire having a plurality of conductive routes. Applicable as the composite wire is a twisted wire or a composite cable, for example, formed of a plurality of single wires combined with each other. The wiring member 60 may include an optical fiber cable, for example.

More specifically, one end portions of the plurality of wiring members 60 extend from the door 10 in a bundled state via a part of the door 10 (in the example illustrated in FIG. 1, the side plate part 23 on a side of a door hinge), and is led inside the vehicle body. One end portions of the plurality of wiring members 60 are assumed to be connected to the vehicle body apparatus 14 or a relay connector provided to an end portion of a wiring member extending from a vehicle body apparatus via a vehicle body side connector 70, for example. The vehicle body apparatus 14 is not particularly limited, but is assumed to be an electric control unit (ECU) or a battery, for example. A grommet 78 may be attached to a portion of the plurality of wiring members 60 extending between the door 10 and the vehicle body. In the example illustrated in FIG. 1, the grommet 78 is a so-called a through grommet, and is held in a state of being inserted into a through hole formed in the side plate part 23. Accordingly, ingress of water through the through hole is suppressed. An adhesive tape, for example, may be wound around one end portions of the plurality of wiring members 60. An exterior member such as a corrugate tube may be attached to one end portions of the plurality of wiring members 60.

The present embodiment indicates an example that the wiring member 60 is led into the vehicle door panel 20 from the vehicle body through the through hole, and is led to an outer side of the vehicle door panel 20 through the first service hole 26 or the second service hole 27 in accordance with a position of the door apparatus as a connection destination. Differing from the present example, it is also applicable that the wiring member is disposed along a surface of the inner panel 22 on the vehicle interior side, and is led into the vehicle door panel 20 through the first service hole 26 or the second service hole 27 in accordance with a position of the door apparatus as a connection destination.

When the door 10 is openably and closably supported by the vehicle body via a hinge, the through hole described above is provided to a portion of the door 10 on a side of the hinge. However, the door 10 may be slid with respect to the vehicle body to be openably and closably supported by the vehicle body.

The plurality of wiring members 60 extend from the grommet 78 on a way from one end portion to the other portion, and are branched and extend toward the door apparatus as connection destinations, respectively. Connectors 72a, 72b, 72c, 72d, and 72e corresponding to the door apparatuses as the connection destinations, respectively, are provided to each end portion of a branch destination of the plurality of wiring members 60. The connectors 72a, 72b, 72c, 72d, and 72e are connected to connectors provided to door apparatuses 76a, 76b, 76c, 76d, and 76e, respectively. End portions of the branch destinations of the plurality of wiring members 60 may be directly connected to the door apparatuses 76a, 76b, 76c, 76d, and 76e, respectively.

The door apparatus 76a is a speaker apparatus 76a incorporated into the door 10, for example. The speaker apparatus 76a is provided in a position lower than the first service hole 26 in the inner panel 22. For example, the connector on a side of the speaker apparatus 76a is provided to the inner space of the vehicle door panel 20. In the description hereinafter, the wiring member 60 connected to the speaker apparatus 76a via the connector, for example, is referred to as the wiring member 60a in some cases. Such a wiring member 60a is assumed to be an electrical wire transmitting a sound signal.

The door apparatus 76b is an apparatus provided in a position of the door 10 closer to a front side in relation to a center thereof in the front-back direction, for example. The door apparatus 76b is an electrical door mirror 76b, for example. The electrical door mirror 76b is provided to a front portion of the door, and more specifically, in a position on a front side of a closed window. An actuator for changing a direction of a mirror and an actuator for housing and expanding an electrical door are incorporated into the electrical door mirror 76b. Connectors on a side of these actuators are provided to the inner space of the vehicle door panel 20. In the description hereinafter, a door mirror wiring member in the wiring member 60 connected to the electrical door mirror 76b via the connector, for example, is referred to as the wiring member 60b in some cases. Such a wiring member 60b is assumed to be an electrical wire supplying electrical power to the actuators described above.

The door apparatus 76c is an apparatus provided in a position of the door 10 closer to a back side in relation to the center thereof in the front-back direction, for example. The door apparatus 76c is a door handle apparatus 76c, for example. That is to say, a handle 76C for opening and closing the door 10 is provided to the door 10. The handle 76C is provided to the outer panel 21 to be exposed to an outer side of the vehicle. The door handle apparatus 76c is a sensor detecting an opening-closing operation ofa key, a sensor detecting an operation of an outer handle, an antenna device performing at least one of transmission and/or reception of a signal to and/or from a key-side antenna device, a switch provided to the handle 76C (for example, a switch for releasing a door lock in accordance with an authorization result on a wireless communication key), for example. A connector on a side of the door handle apparatus 76c is provided to an inner portion of the outer panel 21. In the description hereinafter, a door handle wiring member in the wiring member 60 connected to the door handle apparatus 76c via the connector is referred to as the wiring member 60c in some cases. Such a wiring member 60c is assumed to be an electrical wire supplying electrical power or transmitting a signal to the door handle apparatus 76c.

The door apparatus 76d is an apparatus provided in a position of the door 10 closer to the back side in relation to the center thereof in the front-back direction, for example. The door apparatus 76d is a door locking actuator 76d, for example. That is to say, a door locking device for locking and unlocking the door 10 is incorporated into the vehicle body, and the door locking actuator 76d is provided to the door locking device in the door 10. A connector on a side of the door locking actuator 76d may be provided on the outer side (inner side of the vehicle) of the inner panel 22. In the description hereinafter, a door locking wiring member in the wiring member 60 connected to the door locking actuator 76d via the connector is referred to as the wiring member 60d in some cases. Such a wiring member 60d is assumed to be an electrical wire supplying electrical power to the door locking actuator 76d.

The door apparatus 76e is an apparatus provided in a position of the door 10 closer to the back side in relation to the center thereof in the front-back direction, for example. The door apparatus 76e is a foot lamp 76e lighting feet when the door 10 is opened, for example. A connector on a side of the foot lamp 76e may be provided on the outer side (inner side of the vehicle) of the inner panel 22. In the description hereinafter, the wiring member 60 connected to the foot lamp 76e is referred to as the wiring member 60e in some cases. Such a wiring member 60e is assumed to be an electrical wire supplying electrical power to the foot lamp 76e.

In this manner, the wiring member 60 is connected to the door apparatus provided on the inner side of the vehicle door panel 20 or the door apparatus provided on the outer side of the vehicle door panel 20 with respect to the inner panel 22. Thus, the wiring member 60 is led in and out of the inner panel 22 through the service holes 26 and 27. At least a part of the wiring member 60 is disposed in the vehicle door panel 20, and is connector-connected to the door apparatus in the vehicle door panel 20. Thus, when the wiring member 60 is attached to the vehicle door panel 20, an operation of passing the wiring member 60 through the service holes 26 and 27, an operation of leading out the wiring member 60 in the vehicle door panel 20 and fixing the wiring member 60 in the vehicle door panel 20 as necessary, and furthermore, an operation of connector-connecting the wiring member 60 in the vehicle door panel 20 occur.

All of the door apparatuses 76a, 76b, 76c, 76d, and 76e need not necessarily be provided, however, some of them may be omitted. Positions of the door apparatuses 76a, 76b, 76c, 76d, and 76d may be changed in accordance with functional or design convenience. For example, the speaker apparatus 76a may be provided closer to the back side of the door 10. The other door apparatus such as various types of switching apparatus (window opening-closing switch and door locking opening-closing switch, for example), a receiving antenna receiving power supply from an in-vehicle apparatus in a non-contact manner, a communication apparatus performing wireless communication with an in-vehicle apparatus, and an in-vehicle door handle apparatuses, for example, may be provided.

The plurality of wiring members 60 include a wiring member according to the door apparatus provided to the door 10. The wiring member 60 may include a wiring member which is not connected to a vehicle body apparatus but connects the door apparatuses.

The plurality of wiring members 60 are branched in accordance with the door apparatuses 76*a*, 76*b*, 76*c*, 76*d*, and 76*e* described above on a way from one end portion to the other portion. In the present embodiment, the wiring member 60*a* is branched from the other wiring members 60*b*, 60*c*, 60*d*, and 60*e* in a portion extending from the grommet 78 in the vehicle door panel 20. The wiring member 60*a* is connected to a connector on a side of the speaker apparatus 76*a* in a lower side of the first service hole 26 in the vehicle door panel 20.

The wiring member 60*b* is held by the first cover body part 44 to be directed to the electrical door mirror 76*b*. That is to say, the wiring member 60*b* is guided toward the electrical door mirror 76*b* from the vehicle body apparatus 14 via the first cover body part 44. It is sufficient that the cover body part 42 guides the wiring member 60 toward an area near the door apparatus as the connection destination, thus the wiring member 60 may be bended between the cover body part 42 and the door apparatus as the connection destination. The wiring member 60*b* may also be bended between the cover body part 42 and the electrical door mirror 76*b*.

The wiring members 60*c*, 60*d*, and 60*e* are held by the second cover body part 46 to be directed to the door handle apparatus 76*c*, the door locking actuator 76*d*, and the foot lamp 76*e*, respectively. More specifically, the wiring members 60*c*, 60*d*, and 60*e* are guided to be directed to the door handle apparatus 76*c*, the door locking actuator 76*d*, and the foot lamp 76*e*, respectively, from the vehicle body apparatus 14 via the first cover body part 44, the connection part 48, and the second cover body part 46. All of the wiring members 60*c*, 60*d*, and 60*e* need not necessarily pass through the first cover body part 44. Also applicable is a configuration that some or all of the wiring members 60*c*, 60*d*, and 60*e* are guided by the second cover body part 46 from the vehicle body apparatus 14 without passing through the first cover body part 44.

More specifically, the wiring members 60*b*, 60*c*, 60*d*, and 60*e* are led to the outer side (inner side of the vehicle) from the inner side of the vehicle door panel 20 through the wiring passing part 44*h* on the lower side formed in the first cover body part 44. Herein, the wiring passing part 44*h* is formed in a lower portion of the frame part 44*b* in the first cover body part 44. In the vehicle door panel 20, the wiring members 60*b*, 60*c*, 60*d*, and 60*e* extending from the grommet 78 are branched to an upper side of the wiring member 60*a*, and led to an outer surface (a surface on the vehicle interior side) of the first cover body part 44 through the wiring passing part 44*h* described above of the first cover body part 44. The wiring members 60*b*, 60*c*, 60*d*, and 60*e* are held by the first cover body part 44 by at least this passing part. The wiring members 60*b*, 60*c*, 60*d*, and 60*e* may also be held by the first cover body part 44 along a predetermined route. For example, it is also applicable that the wiring member 60*b* is branched from the wiring members 60*c*, 60*d*, and 60*e* on the first cover body part 44, and the wiring members 60*b*, 60*c*, 60*d*, and 60*e* are held so that the wiring member 60*b* is directed to the upper side and the wiring members 60*c*, 60*d*, and 60*e* are directed to the second cover body part 46 (back side).

A structure of holding the routes of the wiring members 60*b*, 60*c*, 60*d*, and 60*e* on the first cover body part 44 is not particularly limited as long as at least a part of the wiring member 60*b*, the wiring member 60*c*, the wiring member 60*d*, and/or the wiring member 60*e* can be held along a predetermined route on the first cover body part 44. The holding state of the wiring members 60*b*, 60*c*, 60*d*, and 60*e* on the first cover body part 44 may be a contact area fixation state or a non-contact area fixation state.

Herein, the contact area fixation state indicates that a portion where the wiring member 60 and a fixation target have contact with each other is stuck and is not separated, thus the wiring member 60 and the fixation target is kept in a fixed state. Applicable as the state of the contact area fixation are a contact area indirect fixation and a contact area direct fixation. The contact area indirect fixation indicates that the wiring member 60 and the fixation target are indirectly stuck and fixed via an intervening member such as an adhesive agent, a gluing agent, and a double-sided adhesive tape provided therebetween. The contact area direct fixation indicates that the wiring member 60 and the fixation target are directly stuck and fixed without an intervention of the adhesive agent, for example, which is separately provided. Assumed in the contact area direct fixation is that resin included in at least one of the wiring member 60 and/or the fixation target is melted, thus the wiring member 60 and the fixation target are stuck and fixed, for example.

The non-contact area fixation indicates the fixing state which is not the contact area fixation. For example, a sewing thread, the other sheet material, or an adhesive tape presses the wiring member 60 toward the fixation target, or a sewing thread, the other sheet material, or an adhesive tape surrounds the wiring member 60 and the fixation target, thereby sandwiching the wiring member 60 and the fixation target to keep the wiring member 60 and the fixation target fixed to each other.

The non-contact area fixation is adopted as the fixing state of the wiring member 60 to the first cover body part 44 herein. More specifically, a sheet-like press member 90 is attached to one surface of the first cover body part 44 while passing across the wiring member 60 in a state where the wiring member 60 is disposed on one surface of the first cover body part 44. The press member 90 may be attached to the first cover body part 44 by a gluing layer (or a gluing agent), an adhesive agent, or welding, for example. When the press member 90 is an adhesive tape, the wiring member 60 is easily held by the service hole cover 40 by attaching the adhesive tape to the service hole cover 40 along the wiring member 60. A groove may be formed along a route of the wiring member 60 in the service hole cover 40. In this case, it is sufficient that the press member 90 is attached to the service hole cover 40 to pass across the groove while the wiring member 60 is housed in the groove. Accordingly, a positional deviation of the wiring member 60 is suppressed.

The wiring member 60*b* is held on one surface of the main cover part 44*a* of the first cover body part 44 along a route from a lower side toward an upper side, and led into the vehicle door panel 20 through the wiring passing part 44*h* formed on an upper portion of the frame part 44*b*. Then, the connector 72*b* on the end portion of the wiring member 60*b* is connected to a connector on a side of the electrical door mirror 76*b*.

The wiring members 60*c*, 60*d*, and 60*e* are held on one surface of the main cover part 44*a* of the first cover body part 44 along a route branched from the wiring member 60*b* on a way from the lower side toward the upper side to be directed to the back side, and pass on the frame part 44*b* and the flange part 44*c* and further on the connection part 48 to be directed to the back side. The wiring members 60*c*, 60*d*, and 60*e* are held by the second cover body part 46. The structure similar to the structure of holding the wiring members in the first cover body part 44 described above can be applied to a structure of holding the wiring members 60*c*, 60*d*, and 60*e* on the second cover body part 46. The wiring members 60*c*, 60*d*, and 60*e* may be held on the connection part 48 by a configuration similar to that in the first cover body part 44 described above.

The wiring members 60*c*, 60*d*, and 60*e* pass across the frame part 46*b* and the flange part 46*c* in a front portion of the second cover body part 46 to be held on one surface of the main cover part 46*a* along a predetermined route. Herein, the wiring members 60*c*, 60*d*, and 60*e* are directed from the front side toward the back side along a common route. The wiring member 60*e* is branched from the wiring members 60*c* and 60*d* on a way of the common route to be directed to the lower side. The wiring member 60*c* is branched from the wiring member 60*d* on a further back side of the branch portion where the wiring member 60*e* is branched, and is directed to the upper side. The wiring member 60*d* remains as it is, and is directed to the back side.

The wiring member 60*c* is led into the vehicle door panel 20 through the wiring passing part 46*h* formed on the upper portion of the frame part 46*b* of the second cover body part 46. Then, the connector 72*c* on the end portion of the wiring member 60*c* is connected to a connector on the side of the handle apparatus 76*c* in the vehicle door panel 20.

The wiring member 60*d* passes on the frame part 46*b* on the back portion and the flange part 46*c* toward the back side, and is connected to a connector on the side of the door locking actuator 76*d* on the outer side of the vehicle door panel 20.

The wiring member 60*e* passes on the frame part 46*b* on the lower portion and the flange part 46*c* toward the lower side, and is connected to a connector on the side of the foot lamp 76*e* on the outer side of the vehicle door panel 20.

When the wiring member 60 described above is assembled to the vehicle door panel 20, the service hole cover 40 is held on the inner panel 22 using the catching part 50 (refer to FIG. 5). More specifically, the catching part 50 is caught on the edges of the service holes 26 and 27 in the inner panel 22, and the service hole cover 40 is temporarily held on the inner panel 22 in an oblique posture with respect to the inner panel 22. In this posture, the lower portion of the service hole cover 40 has contact with an outward surface (a surface facing the vehicle interior) of the inner panel 22, and a web of the service hole cover 40 is away from the inner panel 22.

In this state, at least the upper side of the service holes 26 and 27 is opened, thus the finger of the operator or the robot hand can perform a routing operation of the wiring member 60 through the openings of the service holes 26 and 27. Assumed as the routing operation are an operation of passing the wiring member 60 through the service holes 26 and 27, an operation of locating the wiring member 60 in a space in the vehicle door panel 20 and fixing the wiring member 60 in the space as necessary, and an operation of connector-connecting the wiring member 60 to the door apparatus in the space. At this time, when the wiring member 60 is held by the service hole cover 40, an operation of assembling the wiring member 60 held near the service holes 26 and 27 via the service hole cover 40 to the vehicle door panel 20 can be easily performed. Subsequently, the state of the catching part 50 caught on the inner panel 22 is released, and the service hole cover 40 is attached to the inner panel 22 to cover the service holes 26 and 27 by the first cover body part 44 and the second cover body part 46. Accordingly, the operation of attaching the door wiring module 30 is finished.

According to the service hole cover 40 and the door wiring module 30 having such a configuration, the catching part 50 is caught on the inner panel 22, thus the service hole cover 40 is temporarily held near the service holes 26 and 27. At least a part of the service hole 26 and/or the service hole 27 is opened while the catching part 50 is caught on the inner panel 22, and this opened area can serve as the operation region in the service holes 26 and 27. Thus, the service hole cover 40 can be temporarily held near the service holes 26 and 27 while ensuring the operation region in the service holes 26 and 27. In this state, the operation of assembling the wiring member 60 to the vehicle door panel 20 can be easily performed.

When at least one of the wiring passing parts 44*h* and/or 46*h* is provided adjacent to the catching part 50, a difference of a length of a route of the wiring member 60 passing through the wiring passing parts 44*h* and 46*h* can be reduced between the temporal holding state of the service hole cover 40 and the final assembling state of the service hole cover 40 assembled to the inner panel. Accordingly, an excessive length of the wiring member 60 can be made to be as short as possible.

Applied is the configuration that the catching part 50 is caught on the edges of the service holes 26 and 27, thus the service hole cover 40 is easily held on the inner panel 22 even when a special hole for catching the catching part 50 is not provided in the inner panel 22.

The tip catching part 54 is away from the inner surface of the inner panel 22 in the final attachment state. The catching part 50 can be caught on the inner panel 22 while the gap is provided between the inner panel 22 and the service hole cover 40 in accordance with the dimension D1 from the tip catching part 54 to the inner surface. The service hole cover 40 is greatly inclined with respect to the inner panel 22 using this gap, for example, thus at least a part of the service hole 26 and/or the service hole 27 can be opened as largely as possible.

The plurality of catching parts 50 are provided in the service hole cover 40, and at least a part of the service hole 26 and/or the service hole 27 is opened while the plurality of catching parts 50 are caught on the edges of the service holes 26 and 27, thus the temporal holding state of the service hole cover 40 is stabilized.

The wiring member 60 is held by the service hole cover 40, thus the operation of assembling the wiring member 60 to the inner side of the vehicle door panel 20 can be easily performed while a part of the wiring member 60 is held near the service holes 26 and 27.

In the present embodiment, the catching part 50 needs not be caught on the edges of the service holes 26 and 27. It is also applicable that a temporal holding hole or a rod-like receiving part having a U-like shape is formed in the inner panel 22 and the catching part 50 is caught on the receiving part.

Embodiment 2

Figure 6:
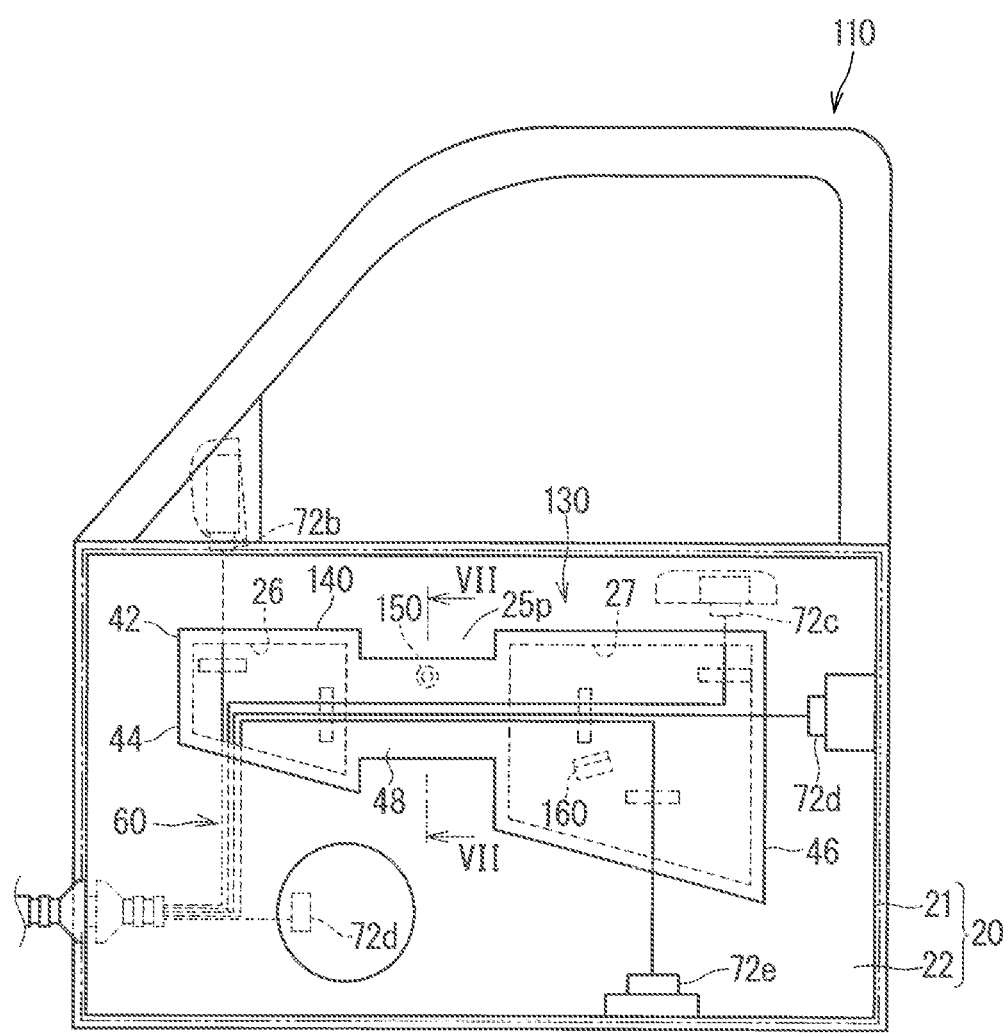
FIG. 6 is a schematic side view illustrating a door into which a service hole cover and a door wiring module according to an embodiment 2 are incorporated.
Figure 7:
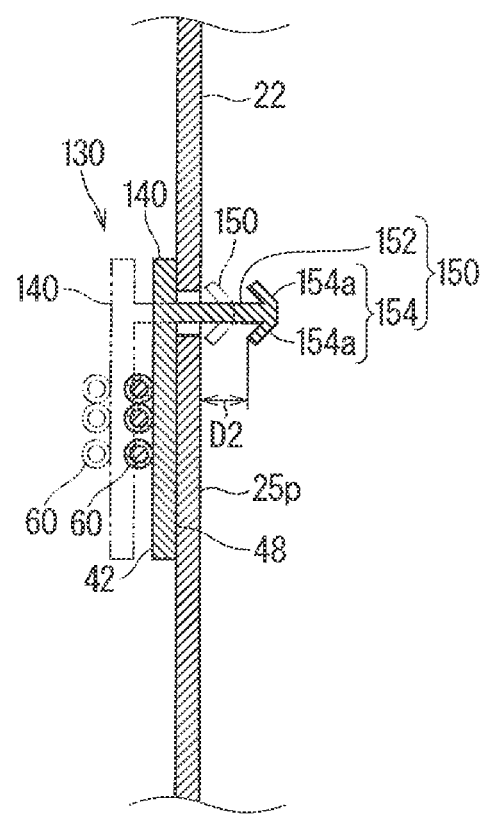
FIG. 7 is a schematic cross-sectional view along a VII-VII line in FIG. 6.
Figure 8:
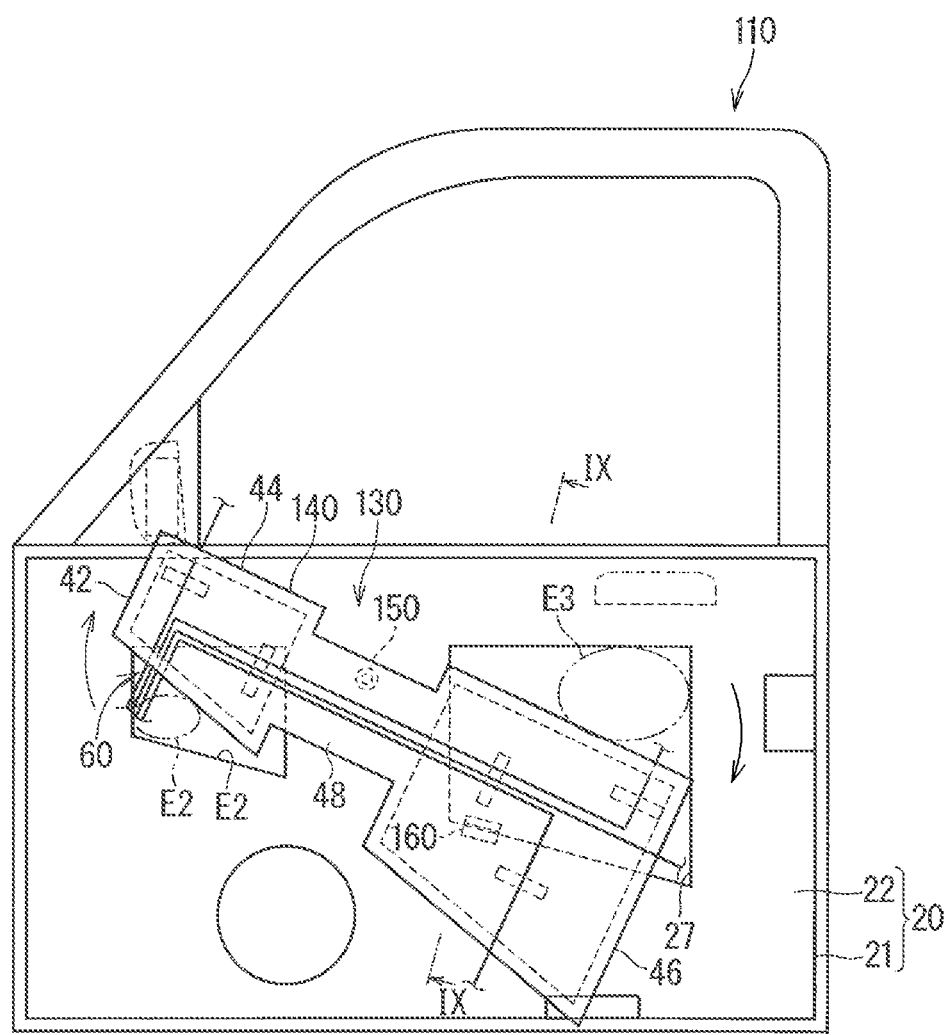
FIG. 8 is a schematic side view illustrating a state where the service hole cover is temporarily held.
Figure 9:
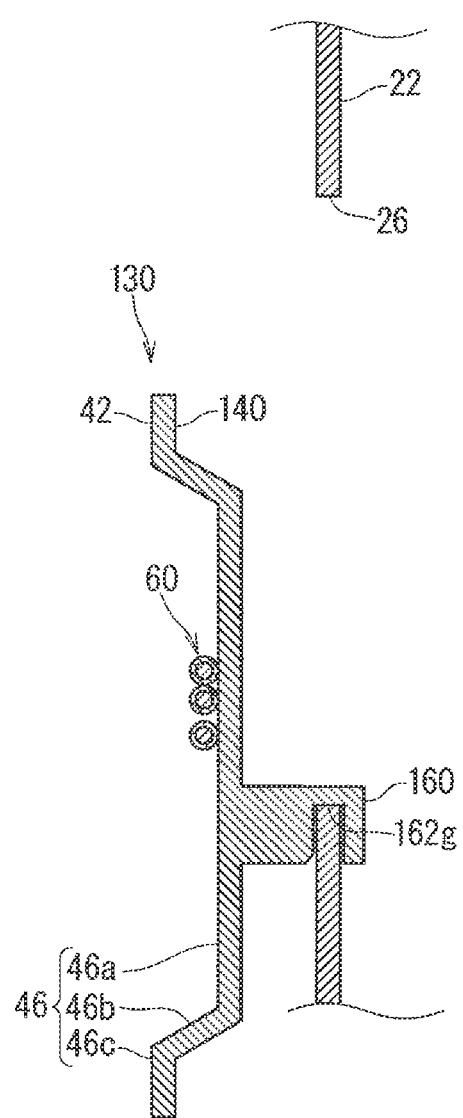
FIG. 9 is a cross-sectional view along a IX-IX line in FIG. 8.

A service hole cover and a door wiring module according to an embodiment 2 are described hereinafter. FIG. 6 is a schematic side view illustrating a door 110 into which a service hole cover 140 and a door wiring module 130 according to the embodiment 2 are incorporated. FIG. 7 is a schematic cross-sectional view along a VII-VII line in FIG. 6. FIG. 8 is a schematic side view illustrating a state where a service hole cover 140 is temporarily held. FIG. 9 is a cross-sectional view along a IX-IX line in FIG. 8. In the description of the present embodiment 2, the same reference numerals are assigned to the similar constituent elements described in the embodiment 1 and the description thereof will be omitted, and a point of difference with the embodiment 1 is mainly described.

In the present embodiment 2, the following catching part 150 is included in place of the catching part 50 in the embodiment 1. The catching part 150 includes an axis part 152 and a retaining part 154. The axis part 152 is formed to protrude from the cover body part 42 of the service hole cover 140 toward the inner side of the vehicle door panel 20. The axis pan 152 may have a cylindrical shape or a polygonal prism shape. The retaining part 154 protrudes to an outer periphery side of the axis part 152 in a position away from the cover body part 42. Then, the retaining part 154 is caught on the inner panel 22 from the inner side of the vehicle door panel 20 while the axis part 152 passes through a hole part 22h formed the inner panel 22. The retaining part 154 may have a configuration including a pair of elastic pieces 154a inclined outward from a tip end portion of the axis part 152 toward a base end side of the axis part 152. In this case, when the catching part 150 is inserted into the hole part 22h of the inner panel 22, the pair of elastic pieces 154a have contact with an edge of the hole part 22h, and can be elastically deformed to easily get close to a side of the axis part 152. Then, the catching part 150 is further inserted into a back of the hole part 22h, and when the pair of elastic pieces 154a pass beyond the hole part 22h, the pair of elastic pieces 154a are elastically restored to have an original shape. Accordingly, a tip end portion of the pair of elastic pieces 154a can be caught on the inner panel 22 so as not to come out thereof at a peripheral edge portion of the hole part 22h. A configuration of the retaining part 154 is not limited to the above example. For example, also applicable is a configuration that the retaining part is formed into an annular shape slightly larger than an inner diameter of the hole part 22h, and comes out of the hole part 22h by elastic deformation of at least one of the retaining part and/or the inner panel 22 to be caught on the hole part 22h so as not to come out thereof.

In the manner similar to the catching part 50, the catching part 150 may be a part molded integrally with the cover body part 42, or a member in which a member formed separately from the cover body part 42 is combined with the cover body part 42.

The retaining part 154 may be provided in a position away from the inner surface (a surface on a side of the outer panel 21) of the inner panel 22 by a distance D2 while the service hole cover 140 is finally assembled to the inner panel 22. That is to say, it is also applicable that the catching part 150 is not caught on the inner panel 22 and is not used for fixation in the final assembling state in the manner similar to the catching part 50. In this case, the service hole cover 140 gets away from the inner panel 22 while the retaining part 154 has contact with the inner surface of the inner panel 22. Thus, the service hole cover 140 can be rotated separately from the inner panel 22.

The axis part 152 may be provided in any position in the cover body part 42. The axis part 152 may be provided in the connection part 48. In this case, the axis part 152 may be rotatably inserted into the hole part 22h formed between the first service hole 26 and the second service hole 27 in the inner panel 22. In this case, each of the first cover body part 44 and the second cover body part 46 can be rotated around the axis part 152 on both sides of the axis part 152. Thus, a portion of each of the service holes 26 and 27 away from the axis part 152 can be easily opened.

A rotation regulation protrusion part 160 may be provided to the service hole cover 140 (refer to FIG. 8 and FIG. 9). The rotation regulation protrusion part 160 is a part in which the cover body part 42 in a state of being rotated around the axis part 152 from the final attachment posture of covering the service holes 26 and 27 is caught on the edges of the service holes 26 and 27 (herein, the service hole 27). In the present embodiment, the rotation regulation protrusion part 160 is formed in the second cover body part 46.

The rotation regulation protrusion part 160 has contact with the service hole 27 while the service hole cover 140 is rotated to a position where the service holes 26 and 27 are opened to be suitable for the operation. In the present embodiment, the rotation regulation protrusion part 160 is formed in a position closer to an upper side in relation to a lower edge of the second cover body part 46. The rotation regulation protrusion part 160 preferably includes a part having contact with the edge of the service hole 27 from the inner side of the vehicle door panel 20 in addition to a part having contact therewith from the inner side of the service hole 27. In the present embodiment, the rotation regulation protrusion part 160 includes a groove part 162g opened downward. The groove part 162g is formed into a shape in which the edge of the service hole 27 can be fitted. The rotation of the service hole cover 140 is regulated in a state where the edge of the service hole 27 is fitted into the groove part 162g. In addition, a position of the service hole cover 140 is regulated in a thickness direction of the inner panel 22. Thus, the service hole cover 140 is rotated around the axis part 152, and a temporal holding state where at least a part of the service hole 26 and/or the service hole 27 is opened is stabilized. It is not necessary to form the groove part 162g in the rotation regulation protrusion part 160. The rotation regulation protrusion part 160 may be omitted.

When the wiring member 60 described above is assembled to the vehicle door panel 20, the service hole cover 140 is held on the inner panel 22 using the catching part 150 (refer to FIG. 8). More specifically, the service hole cover 140 is rotated around the axis part 152 while the catching part is inserted into the hole part 22h and the retaining part 154 does not come out of the inner panel 22. Herein, the service hole cover 40 is rotated around the axis part 152 so that the second cover body part 46 larger and heavier than the first cover body part 44 is located lower than the first cover body part 44. The service hole cover 140 is temporarily held while the rotation regulation protrusion part 160 has contact with the edges of the service holes 26 and 27. In this temporal holding state, a lower region E2 in the first service hole 26 away from the axis part 152 is opened, and an upper region E3 in the second service hole 27 away from the axis part 152 is opened. Thus, the hand of the operator or the robot hand can perform the operation of assembling the wiring member 60 through the regions E2 and E3 in the openings of the service holes 26 and 27 in the manner similar to the embodiment 1 described above.

When the operation of assembling the wiring member 60 is finished, the service hole cover 140 is rotated around the axis part 152 so that the rotation regulation protrusion part 160 gets away from the service hole 27. Then, the first cover body part 44 covers the first service hole 26, and the second cover body part 46 covers the second service hole 27. Subsequently, the catching part 150 is further pressed into the hole part 22h while the axis part 152 remains in the hole part 22h to attach the service hole cover 140 to the inner panel 22. In the final attachment state, positions of the catching part 150 and the hole part 22h need not coincide with each other, and in this case, the catching part 150 may be pulled out of the hole part 22h.

According to the present embodiment 2, the catching part 150 is inserted into the hole part 22h and caught thereon so as not to come out thereof, thus the service hole cover 140 is temporarily held on the inner panel 22. The service hole cover 140 is rotated around the axis part 152, thus at least a part of the service hole 26 and/or the service hole 27 can be opened. Accordingly, the wiring member 60 can be easily assembled to the vehicle door panel 20 in the manner similar to the embodiment 1 described above.

The wiring passing part may be provided adjacent to the catching part 150 in the manner similar to the embodiment 1. Accordingly, an excessive length of the wiring member necessary for the operation can be made to be as short as possible.

When the retaining part 154 is away from the inner surface of the inner panel 22 while the service hole cover 40 is finally attached to the inner panel 22, the gap can be provided between the inner panel 22 and the service hole cover 140. The service hole cover 140 can be easily rotated around the axis part 152 by this gap. Accordingly, at least a part of the service hole 26 and/or the service hole 27 can be easily opened.

The axis part 152 is provided in the connection part 48 between the first cover body part 44 and the second cover body part 46, thus both the cover body parts 44 and 46 can be rotated around the axis part 152 therebetween. Accordingly, the portion of each of the service holes 26 and 27 away from the axis part 152 can be easily opened.

The service hole cover 140 includes the rotation regulation protrusion part 160, thus the cover body part 42 is rotated from the attachment posture, and the state where at least a part of the service hole 26 and/or the service hole 27 is opened is stably kept.

The wiring member 60 is held by the service hole cover 140, thus the wiring member 60 is easily assembled to the vehicle door panel 20 while being held near the service holes 26 and 27.

Each configuration described in the above embodiments and modification examples thereof can be appropriately combined as long as they are not contradictory.

EXPLANATION OF REFERENCE SIGNS 10, 110 door
14 vehicle body apparatus
16 design trim
20 vehicle door panel
21 outer panel
22 inner panel
22h hole part
23 side plate part
25 main plate part
25p intervention portion
26 first service hole
27 second service hole
30, 130 door wiring module
40, 140 service hole cover
42 cover body part
44 first cover body part
44a, 46a main cover part
44b, 46b frame part
44c, 46c flange part
44h, 46h wiring passing part
46 second cover body part
48 connection part
50, 150 catching part
52 base part
54 tip catching part
60, 60a, 60b, 60c, 60d, 60e wiring member
61 core wire
62 covering layer
70 vehicle body side connector
72a, 72b 72c, 72d, 72e connector
76C handle
76a, 76b, 76c, 76d, 76e door apparatus
78 grommet
90 press member
152 axis part
154 retaining part
154a elastic piece
160 rotation regulation protrusion part
162g groove part

The invention claimed is:

1. A service hole cover covering a service hole formed in an inner panel in a vehicle door panel, comprising:
a cover body part covering the service hole; and
at least one catching part provided to protrude from the cover body part to a side of the inner panel, wherein
the catching part is caught on the inner panel while at least a part of the service hole is opened,
wherein
a wiring passing part, in which a wiring member passes through a portion between both surfaces of the cover body part, is defined by a passage formed in a periphery of the cover body part, and
the wiring passing part is formed adjacent to the catching part.

2. The service hole cover according to claim 1, wherein the catching part includes: a base part protruding from the cover body part toward an inner side of the vehicle door panel; and a tip catching part protruding to an outer periphery side of the cover body part from the base part in a position away from the cover body part, and the tip catching part is caught on the inner panel from an inner side of the vehicle door panel while the base part has contact with an edge of the service hole.

3. The service hole cover according to claim 2, wherein the tip catching part is provided in a position away form from an inner surface of the inner panel while the service hole cover is attached to the inner panel.

4. The service hole cover according to claim 1, wherein the plurality of catching parts are provided, and
at least a part of the service hole is opened while the plurality of catching parts are caught on the edge of the service hole.

5. The service hole cover according to claim 1, wherein the catching part includes an axis part protruding from the cover body part toward an inner side of the vehicle door panel and a retaining part protruding to an outer periphery side of the axis part in a position away from the cover body part, and
the retaining part is caught on the inner panel from the inner side of the vehicle door panel while the axis part rotatably passes through a hole part formed in the inner panel.

6. The service hole cover according to claim 5, wherein the retaining part is provided in a position away form an inner surface of the inner panel while the service hole cover is attached to the inner panel.

7. The service hole cover according to claim 5, wherein the service hole includes a first service hole and a second service hole, the cover body part includes a first cover body part covering the first service hole, a second cover body part covering the second service hole, and a connection part connecting the first cover body part and the second cover body part, and the axis part is provided to the connection part to be rotatably inserted into the hole part formed between the first service hole and the second service hole in the inner panel.

8. The service hole cover according to claim 5, further comprising a rotation regulation protrusion part caught in the edge of the service hole while the cover body part is rotated around the axis part from an attachment posture in which the cover body part covers the service hole.

9. A door wiring module, comprising:

the service hole cover according to claim 1; and a wiring member held by the service hole cover.

10. The service hole cover according to claim 1, wherein the passage comprises holes or concaved portions formed in the periphery of the cover body part.

11. A service hole cover covering a service hole formed in an inner panel in a vehicle door panel, comprising:

a cover body part covering the service hole;

at least one catching part provided to protrude from the cover body part to a side of the inner panel, wherein the catching part is caught on the inner panel while at least a part of the service hole is opened, and wherein the catching part includes: a base part protruding from the cover body part toward an inner side of the vehicle door panel; and a tip catching part protruding to an outer periphery side of the cover body part from the base part in a position away from the cover body part, and the tip catching part is caught on the inner panel from an inner side of the vehicle door panel while the base part has contact with an edge of the service hole; and a lower portion of the service hole cover comes in contact with a surface facing the vehicle interior of the inner panel and at least a part of the service hole is opened.

12. A service hole cover covering a service hole formed in an inner panel in a vehicle door panel, comprising:

a cover body part covering the service hole;

at least one catching part provided to protrude from the cover body part to a side of the inner panel, wherein the catching part is caught on the inner panel while at least a part of the service hole is opened, and wherein the catching part includes an axis part protruding from the cover body part toward an inner side of the vehicle door panel and a retaining part protruding to an outer periphery side of the axis part in a position away from the cover body part, and the retaining part is caught on the inner panel from the inner side of the vehicle door panel while the axis part rotatably passes through a hole part formed in the inner panel; and wherein the service hole includes a first service hole and a second service hole, wherein the cover body part includes a first cover body part covering the first service hole, a second cover body part covering the second service hole, and a connection part connecting the first cover body part and the second cover body part, and the axis part is provided to the connection part to be rotatably inserted into the hole part formed between the first service hole and the second service hole in the inner panel.

* * * * *